US009026381B2

(12) United States Patent
Yokohata (10) Patent No.: US 9,026,381 B2
(45) Date of Patent: May 5, 2015

(54) FLOW RATE MEASUREMENT DEVICE

(75) Inventor: Mitsuo Yokohata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 496 days.

(21) Appl. No.: 13/505,554

(22) PCT Filed: Nov. 2, 2010

(86) PCT No.: PCT/JP2010/006463
§ 371 (c)(1),
(2), (4) Date: May 2, 2012

(87) PCT Pub. No.: WO2011/052241
PCT Pub. Date: May 5, 2011

(65) Prior Publication Data
US 2012/0221258 A1      Aug. 30, 2012

(30) Foreign Application Priority Data

Nov. 2, 2009   (JP) .................................. 2009-251700

(51) Int. Cl.
| G06F 19/00 | (2011.01) |
| G01F 1/00 | (2006.01) |
| G01F 15/00 | (2006.01) |
| G01F 15/04 | (2006.01) |
| G01F 15/075 | (2006.01) |

(52) U.S. Cl.
CPC .............. *G01F 15/00* (2013.01); *G01F 15/046* (2013.01); *G01F 15/0755* (2013.01)

(58) Field of Classification Search
CPC ... G01F 15/0755; G01F 15/00; G01F 15/046; G01F 1/66; G01F 25/0053
USPC .............................................. 702/45, 50, 100
See application file for complete search history.

(56) References Cited

U.S. PATENT DOCUMENTS

| 7,809,514 | B2 | 10/2010 | Miyata et al. |
| 2009/0271128 | A1 | 10/2009 | Umekage et al. |

(Continued)

FOREIGN PATENT DOCUMENTS

| EP | 2 077 439 A1 | 7/2009 |
| EP | 2 098 833 A1 | 9/2009 |

(Continued)

OTHER PUBLICATIONS

International Search Report for International Application No. PCT/JP2010/006463, dated Jan. 25, 2011, 1 page.

(Continued)

*Primary Examiner* — John H Le
(74) *Attorney, Agent, or Firm* — Brinks Gilson & Lione (57) ABSTRACT

A problem of the present invention is to provide a flow rate measurement device which is capable of simplifying calculation, reducing the amount of memory necessary for calculation, absorbing variations in the flow rate which changes in various ways depending on the state of usage, and improving identification precision of appliances with a configuration which extracts characteristics of appliances. The flow rate measurement device monitors and determines the change in the flow rate measured by a flow rate measurement unit, and extracts and determines codes obtained by a differential conversion unit and appliance characteristic flow rates representing the characteristics of gas appliances, thereby identifying the gas appliances in which appliance characteristics vary depending on the state of usage.

2 Claims, 10 Drawing Sheets

(56) References Cited

U.S. PATENT DOCUMENTS

| | | |
|---|---|---|
| 2010/0292940 A1* | 11/2010 | Iwamoto .................. 702/45 |
| 2010/0326548 A1 | 12/2010 | Miyata et al. |
| 2011/0178732 A1 | 7/2011 | Iwamoto |

FOREIGN PATENT DOCUMENTS

| | | |
|---|---|---|
| JP | 2000-227348 A | 8/2000 |
| JP | 2006-313114 A | 11/2006 |
| JP | 2007-178285 A | 7/2007 |
| JP | 2008-309498 A | 12/2008 |
| JP | 2009-075015 A | 4/2009 |

OTHER PUBLICATIONS

Extended European Search Report in corresponding European Application No. 10826376.5, dated Jan. 7, 2015, 6 pages.

* cited by examiner

| ABSOLUTE FLOW RATE Q(n) | DIFFERENTIAL FLOW RATE ΔQ | CODE |
|---|---|---|
| Q(n) ≠ 0 | 1000 < \|Q(n)\| | F |
| | 800 < \|Q(n)\| ≤ 1000 | E |
| | 600 < \|Q(n)\| ≤ 800 | D |
| | 400 < \|Q(n)\| ≤ 600 | C |
| | 325 < \|Q(n)\| ≤ 400 | B |
| | 250 < \|Q(n)\| ≤ 325 | A |
| | 175 < \|Q(n)\| ≤ 250 | 9 |
| | 100 < \|Q(n)\| ≤ 175 | 8 |
| | 75 < \|Q(n)\| ≤ 100 | 7 |
| | 50 < \|Q(n)\| ≤ 75 | 6 |
| | 40 < \|Q(n)\| ≤ 50 | 5 |
| | 30 < \|Q(n)\| ≤ 40 | 4 |
| | 20 < \|Q(n)\| ≤ 30 | 3 |
| | 10 < \|Q(n)\| ≤ 20 | 2 |
| | \|Q(n)\| ≤ 10 | 1 |
| Q(n) = 0 | FLOW RATE : ZERO | 0 |

| TIME | FLOW RATE Q(n) | DIFFERENTIAL ΔQ | RATIO | CODE |
|---|---|---|---|---|
| 1 | 0 | 0 | – | 0 |
| 2 | 90 | 90 | – | 7 |
| 3 | 145 | 55 | 61.1 | 6 |
| 4 | 150 | 5 | 3.4 | 1 |
| 5 | 158 | 8 | 5.3 | 1 |
| 6 | 208 | 50 | 31.6 | 5 |
| 7 | 203 | -5 | 2.4 | 1 |
| 8 | 204 | 1 | 0.5 | 1 |
| 9 | 204 | 0 | 0.0 | 1 |
| 10 | 204 | 0 | 0.0 | 1 |
| 11 | 204 | 0 | 0.0 | 1 |
| 12 | 204 | 0 | 0.0 | 1 |
| 13 | 204 | 0 | 0.0 | 1 |
| 14 | 203 | -1 | 0.5 | 1 |
| 15 | 204 | 1 | 0.5 | 1 |
| 16 | 204 | 0 | 0.0 | 1 |

Rows 4–5: INTERMEDIATE STABLE FLOW RATE COVERAGE
Rows 7–16: STABLE FLOW RATE COVERAGE (b) FLOW RATE CHANGE (c) CODE CHANGE (d)

| APPLIANCE CHARACTERISTIC CODE SEQUENCE | 07151 |
|---|---|
| INTERMEDIATE FLOW RATE | 147.50 L/h |
| INTERMEDIATE STABLE FLOW RATE | 154.00 L/h |
| STABLE FLOW RATE | 203.75 L/h |

| DATA No. | Appliance characteristic code sequence a | | | Appliance characteristic code sequence b | | |
|---|---|---|---|---|---|---|
| | I | II | III | I | II | III |
| 1 | 0 | 0 | 0 | 0 | 0 | 0 |
| 2 | 12 | 12 | 12 | 13 | 13 | 13 |
| 3 | 3 | 3 | 3 | 8 | 12 | 3 |
| 4 | 9 | 13 | 12 | 9 | 14 | 5 |
| 5 | 1 | 10 | 8 | 3 | 9 | 1 |
| 6 | 3 | 12 | 11 | 5 | 11 | 2 |
| 7 | 1 | 5 | 2 | 2 | 1 | 1 |
| 8 | 2 | 6 | 4 | 3 | 2 | |
| 9 | 1 | 1 | 1 | 1 | 1 | |
| 10 | | 3 | 2 | | | |
| 11 | | 1 | 1 | | 2 | |

| TIME | IV | | | | | V | | | | | VI | | | | |
|---|---|---|---|---|---|---|---|---|---|---|---|---|---|---|---|
| | FLOW RATE Q(n) | DIFFERENTIAL ΔQa | CODE a | DIFFERENTIAL ΔQb | CODE b | RATIO | FLOW RATE Q(n) | DIFFERENTIAL ΔQa | CODE a | DIFFERENTIAL ΔQb | CODE b | RATIO | FLOW RATE Q(n) | DIFFERENTIAL ΔQa | CODE a | DIFFERENTIAL ΔQb | CODE b | RATIO |
| 1 | 0 | — | 0 | — | 0 | — | 0 | — | 0 | — | 0 | — | 0 | — | 0 | — | 0 | — |
| 2 | 31 | 31 | 4 | — | 0 | — | 26 | 26 | 3 | — | 0 | — | 43 | 43 | 5 | — | 0 | — |
| 3 | 457 | 426 | 12 | 457 | 12 | 1374 | 444 | 418 | 12 | 444 | 12 | 1608 | 460 | 417 | 12 | 460 | 12 | 970 |
| 4 | 460 | 3 | 1 | 429 | 12 | 0.66 | 448 | 4 | 1 | 422 | 12 | 0.90 | 452 | -8 | 1 | 409 | 12 | 1.74 |
| 5 | 697 | 237 | 9 | 240 | 9 | 51.52 | 969 | 521 | 12 | 525 | 13 | 116 | 1121 | 669 | 13 | 661 | 13 | 1.52 |
| 6 | 1076 | 379 | 11 | 616 | 13 | 54.38 | 1247 | 278 | 10 | 799 | 12 | 28.69 | 1138 | 17 | 2 | 686 | 13 | 2.99 |
| 7 | 886 | -190 | 9 | 189 | 9 | 17.66 | 1508 | 261 | 10 | 539 | 12 | 20.93 | 1172 | 34 | 4 | 51 | 6 | 1.11 |
| 8 | 892 | 6 | 1 | -184 | 9 | 0.68 | 1528 | 20 | 2 | 281 | 10 | 1.33 | 1159 | -13 | 2 | 21 | 3 | 0.60 |
| 9 | 894 | 2 | 1 | 8 | 1 | 0.22 | 1520 | -8 | 1 | 12 | 2 | 0.52 | 1166 | 7 | 1 | -6 | 1 | 0.34 |
| 10 | 883 | -11 | 2 | -9 | 1 | 1.23 | 1532 | 12 | 2 | 4 | 1 | 0.79 | 1170 | 4 | 1 | 11 | 2 | 2.22 |
| 11 | 885 | 2 | 1 | -9 | 1 | 0.23 | 1526 | -6 | 1 | 6 | 1 | 0.39 | 1144 | -26 | 3 | -22 | 3 | 2.01 |
| 12 | 853 | -32 | 4 | -30 | 3 | 3.62 | 1528 | 2 | 1 | -4 | 1 | 0.13 | 1121 | -23 | 3 | -49 | 5 | 2.01 |
| 13 | 847 | -6 | 1 | -38 | 4 | 0.70 | 1530 | 2 | 1 | 4 | 1 | 0.13 | 1125 | 4 | 1 | -19 | 2 | 0.36 |
| 14 | 849 | 2 | 1 | -4 | 1 | 0.24 | 1532 | 2 | 1 | 3 | 1 | 0.13 | 1144 | 19 | 2 | 23 | 3 | 1.69 |
| 15 | 841 | -8 | 1 | -6 | 1 | 0.94 | 1533 | 1 | 1 | — | 1 | 0.07 | 1123 | -21 | 3 | -2 | 1 | 1.84 |
| 16 | 833 | -8 | 2 | -16 | 2 | 0.95 | 1531 | -2 | 1 | -1 | 1 | 0.13 | 1120 | -3 | 1 | -24 | 3 | 0.27 |

(b) FLOW RATE CHANGE (c) CODE a CHANGE (d) CODE b CHANGE

| | | | WATER HEATER BEING HELD | | |
|---|---|---|---|---|---|
| | | | DETERMINATION RANGE OF I | DETERMINATION RANGE OF II | DETERMINATION RANGE OF III |
| | | | 638.55~780.45L/h | 617.85~755.15L/h | 632.70~773.30L/h |
| USED WATER HEATER | I | 709.5L/h | ○ | ○ | ○ |
| | II | 686.5L/h | ○ | ○ | ○ |
| | III | 703.0L/h | ○ | ○ | ○ |
| | IV | 458.5L/h | × | × | × |
| | V | 446.0L/h | × | × | × |
| | VI | 456.0L/h | × | × | × |

(b)

| | | | WATER HEATER BEING HELD | | |
|---|---|---|---|---|---|
| | | | DETERMINATION RANGE OF IV | DETERMINATION RANGE OF V | DETERMINATION RANGE OF VI |
| | | | 412.65~504.35L/h | 401.40~490.60L/h | 410.40~501.60L/h |
| USED WATER HEATER | I | 709.5L/h | × | × | × |
| | II | 686.5L/h | × | × | × |
| | III | 703.0L/h | × | × | × |
| | IV | 458.5L/h | ○ | ○ | ○ |
| | V | 446.0L/h | ○ | ○ | ○ |
| | VI | 456.0L/h | ○ | ○ | ○ |

FLOW RATE MEASUREMENT DEVICE

This application is a 371 application of PCT/JP2010/006463 having an international filing date of Nov. 2, 2010, which claims priority to JP2009-251700 filed Nov. 2, 2009, the entire contents of which are incorporated herein by reference.

TECHNICAL FIELD

The present invention relates to a technique for correctly identifying an appliance which uses a fluid by capturing a change in a flow rate of the fluid.

BACKGROUND ART

As a gas meter of the related art which specifies a used appliance in a fluid piping system having a gas meter, a gas meter described in Patent Literature 1 is known. The configuration will be described with reference to FIG. 9.

Figure 9:
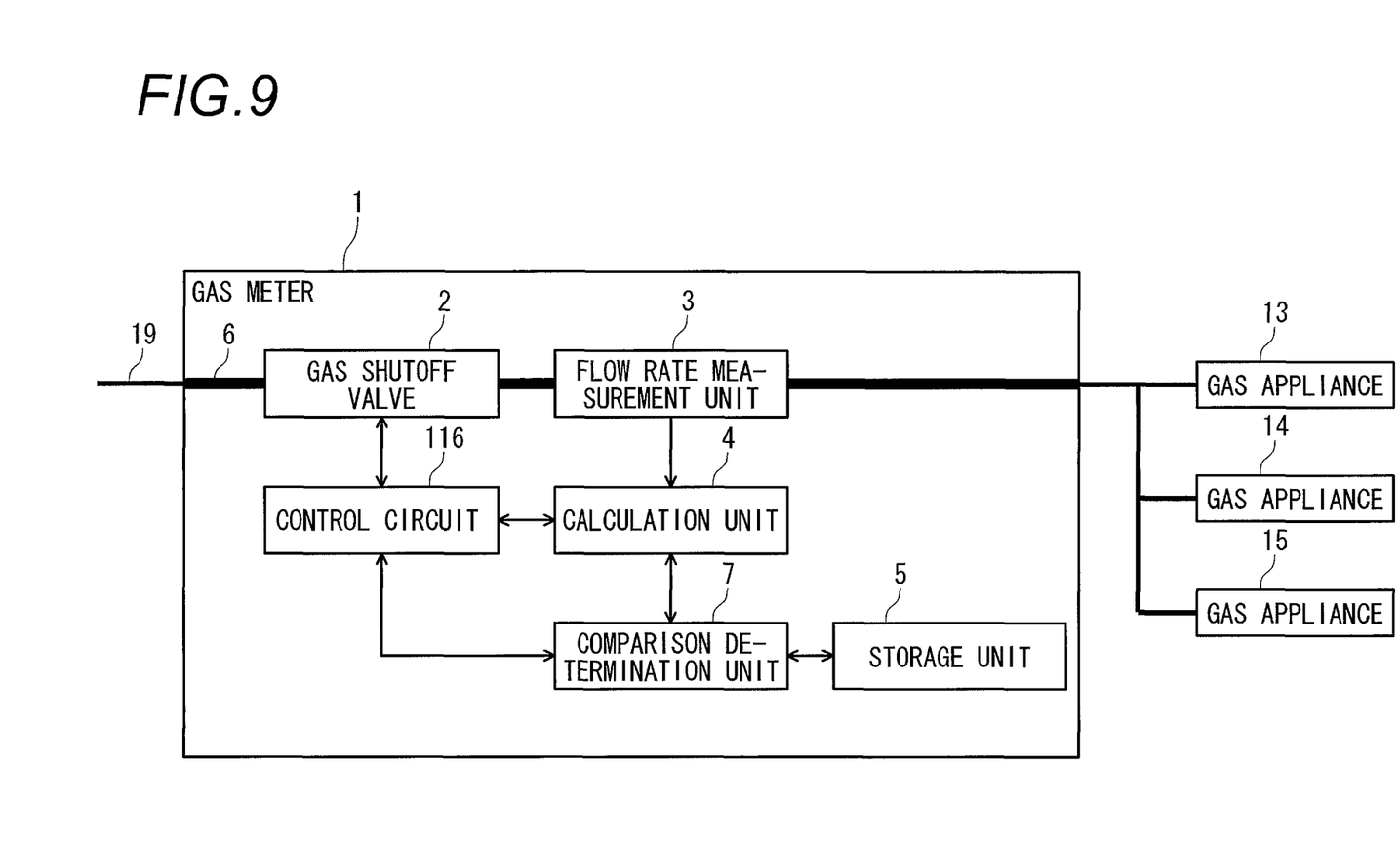
FIG. 9 is a block diagram of a gas meter of the related art.

As shown in FIG. 9, a gas meter 1 is disposed in a flow channel 6 connected to a household gas supply line. The gas meter 1 has flow rate measurement unit 3 for measuring a gas flow rate at a regular time interval, calculation unit 4 for calculating a differential in the flow rates output from the flow rate measurement unit 3, and comparison/determination unit 7 for comparing in magnitude the differential calculated by the calculation unit 4 with a change determination value registered in storage unit 5 and determining a change in the state of usage of the gas appliance. The calculation unit 4, the comparison/determination unit 7, and a gas shutoff valve 2 are controlled by a control circuit 116.

In the gas meter 1, the change in the differential of the instantaneous flow rate output from the flow rate measurement unit 3 is sequentially calculated, and the change in the state of usage of the gas appliance is determined on the basis of the amount of change. Registered data and the measured change (differential) in the gas flow rate are compared, thereby enabling identification of used gas appliances 13, 14, and 15.

As a method of identifying the used appliance of the fluid in the related art, a method described in Patent Literature 2 is known. The configuration will be described with reference to FIG. 10.

Figure 10:
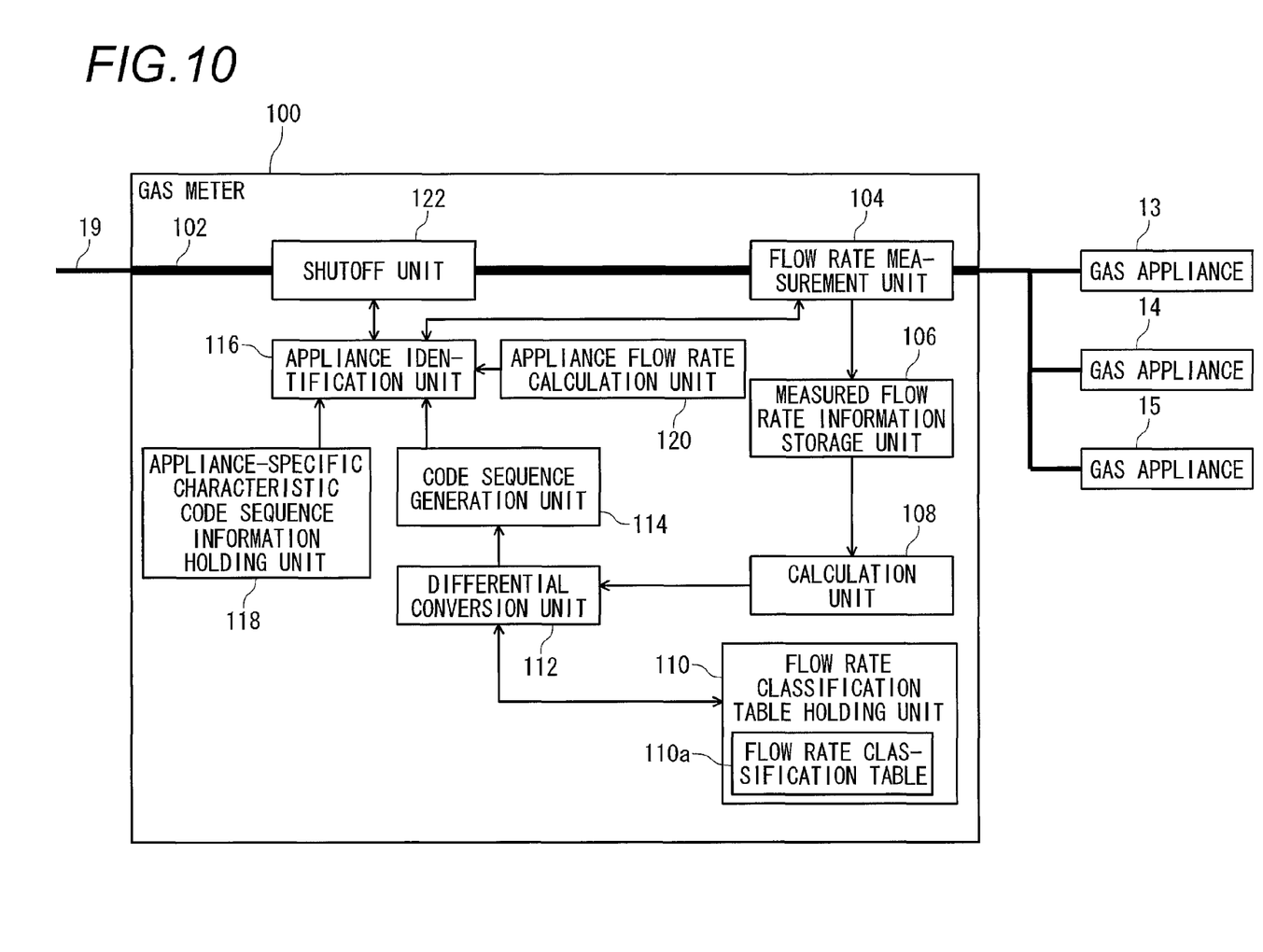
FIG. 10 is a block diagram of a flow rate measurement device of the related art.

As shown in FIG. 10, a calculation unit 108 calculates the differentials of the gas flow rate measured by flow rate measurement unit 104 at regular intervals, and a differential conversion unit 112 classifies the differentials at regular time intervals into predetermined classifications using a flow rate classification table 110a stored in flow rate classification table holding unit 110, and converts the differentials to predetermined codes representing the classifications. An appliance identification unit 116 compares a code sequence generated by code sequence generation unit 114 using the codes converted by the differential conversion unit 112 with appliance-specific characteristic code sequences specific to the appliances stored in an appliance-specific code sequence information holding unit 118, and identifies the appliances.

In the above configuration, a code value obtained by encoding (converting) the differential of the flow rate is used, and at the time of appliance identification, calculation is simplified, thereby reducing the amount of memory or the like necessary for calculation and achieving improvement in calculation speed and appliance identification precision.

CITATION LIST

Patent Literature

Patent Literature 1: JP-A-2006-313114
Patent Literature 2: JP-A-2008-309498

SUMMARY OF INVENTION

Technical Problem

However, with the configuration of the related art, for example, in a water heater, the flow rate changes in various ways depending on the state of usage, such as set temperature, the amount of hot water, or water temperature. For this reason, in the flow rate differential or the code sequence, erroneous determination may be made at the time of comparison with data registered in advance.

The invention solves the problems of the related art, and an object of the invention is to simplify calculation, to reduce the amount of memory necessary for calculation, to absorb variations in the flow rate which changes in various ways depending on the state of usage, and to improve identification precision of a specific kind of appliance with a configuration which extracts characteristics of appliances.

Solution to Problem

In order to solve the problems of the related art, a flow rate measurement device according to an aspect of the invention includes: a flow rate measurement unit that is configured to measure a flow rate of a fluid flowing in a flow channel at a regular time interval; a calculation unit that is configured to calculate a plurality of differentials at regular time intervals in the flow rates measured by the flow rate measurement unit; a flow rate classification table in which a plurality of differential classifications classified according to the magnitude of the differentials are associated with codes representing the respective classifications; a differential conversion unit that is configured to convert the differentials calculated by the calculation unit to the codes on the basis of the flow rate classification table; an appliance characteristic extraction unit that is configured to generate a plurality of appliance-specific code sequences representing characteristics of appliances from a plurality of codes obtained at regular time intervals by the differential conversion unit or extract a plurality of appliance characteristic flow rates representing characteristics of appliances from the flow rates measured by the flow rate measurement unit; and an appliance identification unit that is configured to compare at least either the appliance characteristic code sequences extracted by the appliance characteristic extraction unit with appliance-specific characteristic code sequences specific to the appliances held in appliance-specific characteristic information holding unit or a plurality of appliance characteristic flow rates extracted by the appliance characteristic extraction unit with a plurality of appliance-specific characteristic flow rates specific to the appliances held in the appliance-specific characteristic information holding unit to identity the appliances, wherein when the first peak value or the second peak value of a first appliance characteristic code sequence extracted by the appliance characteristic extraction unit on the basis of codes converted by the differential conversion unit from first differentials calculated by the calculation unit is equal to or greater than a first predetermined value, when the first peak value or the second peak value of a second appliance characteristic code sequence extracted by the appliance characteristic extraction unit on the basis of codes converted by the differential conversion unit from second differentials calculated by the calculation unit is equal to or greater than a second predetermined value, and when the flow rate measured by the flow rate measurement unit is equal to or higher than a predetermined flow rate no later than a predetermined number of times from a rise in the flow rate, the appliance identification unit determines that a used appliance is a specific kind of appliance, and when it is determined that the used appliance is the specific kind of appliance, and compares the used appliance in characteristics with a specific kind of appliance held in the appliance-specific characteristic information holding unit, and if an average flow rate of the current flow rate and the last flow rate extracted by the appliance characteristic extraction unit when a ratio of the last flow rate and the current flow rate is within a predetermined range is different from an average flow rate held in the appliance-specific characteristic information holding unit, the appliance identification unit determines that the used appliance is another specific kind of appliance.

Therefore, it becomes possible to extract the characteristics of the appliances even when the flow rate changes in various ways while a specific kind of appliance is used, and to identify specific kinds of appliances having different characteristics as well as a single specific kind of appliance.

Advantageous Effects of Invention

According to the flow rate measurement device of the aspect of the invention, it becomes possible to simplify calculation, to reduce the amount of memory necessary for calculation, to absorb variations in the flow rate which changes in various ways depending on the state of usage, and to improve identification precision of a water heater with a configuration which extracts characteristics of appliances.

BRIEF DESCRIPTION OF DRAWINGS

In FIG. 3, (a) is a diagram showing a concept of classifying flow rate differentials when using a gas appliance A in accordance with a flow rate classification table in Embodiment 1 of the invention, (b) is a graph showing flow rate characteristics when using the gas appliance A, (c) is a graph showing codes classified when using the gas appliance A, and (d) is a diagram showing a list of characteristics extracted when using the gas appliance A.

In FIG. 4, (a) is a diagram showing a concept of classifying flow rate differentials when using a water heater B in accordance with a flow rate classification table in Embodiment 1 of the invention, (b) is a graph showing flow rate characteristics when using the water heater B, (c) is a graph showing the change in a code a which is converted on the basis of the differential between a current flow rate and a last flow rate when using the water heater B, and (d) is a graph showing the change in a code b which is converted on the basis of the differential between a current flow rate and a second last flow rate when using the water heater B.

In FIG. 5, (a) is a diagram showing a list of appliance characteristic code sequences when using a water heater B in Embodiment 1 of the invention, (b) is a graph showing the change in an appliance characteristic code sequence a when using the water heater B, and (c) is a graph showing the change in an appliance characteristic code sequence b when using the water heater B.

In FIG. 6, (a) is a diagram showing a concept of classifying flow rate differentials when using a water heater C in accordance with a flow rate classification table in Embodiment 2 of the invention, (b) is a graph showing flow rate characteristics when using the water heater C, (c) is a graph showing the change in a code a which is converted on the basis of the differential between a current flow rate and a last flow rate when using the water heater C, and (d) is a graph showing the change in a code b which is converted on the basis of the differential between a current flow rate and a second last flow rate when using the water heater C.

In FIG. 7, (a) is a diagram showing a list of appliance characteristic code sequences when using a water heater C in Embodiment 2 of the invention, (b) is a graph showing the change in an appliance characteristic code sequence a when using the water heater C, and (c) is a graph showing the change in an appliance characteristic code sequence b when using the water heater C.

In FIG. 8, (a) is a diagram showing a list of determination contents of a used water heater when a water heater B is held in appliance-specific characteristic information in Embodiment 2 of the invention, and (b) is a diagram showing a list of determination contents of a used water heater when a water heater C is held in appliance-specific characteristic information.

DESCRIPTION OF EMBODIMENTS

A first aspect of the invention is configured to include: a flow rate measurement unit that is configured to measure a flow rate of a fluid flowing in a flow channel at a regular time interval; a calculation unit that is configured to calculate a plurality of differentials at regular time intervals in the flow rates measured by the flow rate measurement unit; a flow rate classification table in which a plurality of differential classifications classified according to the magnitude of the differentials are associated with codes representing the respective classifications; a differential conversion unit that is configured to convert the differentials calculated by the calculation unit to the codes on the basis of the flow rate classification table; an appliance characteristic extraction unit that is configured to generate a plurality of appliance-specific code sequences representing characteristics of appliances from a plurality of codes obtained at regular time intervals by the differential conversion unit or extract a plurality of appliance characteristic flow rates representing characteristics of appliances from the flow rates measured by the flow rate measurement unit; and an appliance identification unit that is configured to compare at least either the appliance characteristic code sequences extracted by the appliance characteristic extraction unit with appliance-specific characteristic code sequences specific to the appliances held in appliance-specific characteristic information holding unit or a plurality of appliance characteristic flow rates extracted by the appliance characteristic extraction unit with a plurality of appliance-specific characteristic flow rates specific to the appliances held in the appliance-specific characteristic information holding unit to identify the appliances, wherein when the first peak value or the second peak value of a first appliance characteristic code sequence extracted by the appliance characteristic extraction unit on the basis of codes converted by the differential conversion unit from first differentials calculated by the calculation unit is equal to or greater than a first predetermined value, when the first peak value or the second peak value of a second appliance characteristic code sequence extracted by the appliance characteristic extraction unit on the basis of codes converted by the differential conversion unit from second differentials calculated by the calculation unit is equal to or greater than a second predetermined value, and when the flow rate measured by the flow rate measurement unit is equal to or higher than a predetermined flow rate no later than a predetermined number of times from a rise in the flow rate, the appliance identification unit determines that a used appliance is a specific kind of appliance.

Therefore, it is possible to extract characteristics of a specific kind of appliance even when the flow rate changes in various ways due to the difference in the set temperature or the like while the specific kind of appliance is used, and to improve identification precision of a specific kind of appliance.

A second aspect of the invention is configured in the first aspect of the invention so that when the appliance identification unit has determined that the used appliance is the specific kind of appliance, and compares the used appliance in characteristics with a specific kind of appliance held in the appliance-specific characteristic information holding unit, and if an average flow rate of the current flow rate and the last flow rate extracted by the appliance characteristic extraction unit when a ratio of the last flow rate and the current flow rate is within a predetermined range is different from an average flow rate held in the appliance-specific characteristic information holding unit, the appliance identification unit determines that the used appliance is another specific kind of appliance.

Therefore, it is possible to identify specific kinds of appliances having different characteristics as well as a single specific kind of appliance, and to improve identification precision of the water heater.

A third aspect of the invention is a program which causes a computer to function as a whole or a part of the flow rate measurement device as set forth in the first or second aspect of the invention. With this program, at least a portion of the program of the invention can be easily realized using a general-use computer or a server. The program may be recorded on a recording medium or may be distributed using a communication line, thereby simplifying program distribution or installation.

Hereinafter, embodiments of the invention will be described with reference to the drawings. It should be noted that the embodiments are not intended to limit the invention. In the description of the embodiments, the parts having the same configuration and functional effects are represented by the same reference numerals, and overlapping description will not be repeated.

Embodiment 1

Figure 1:
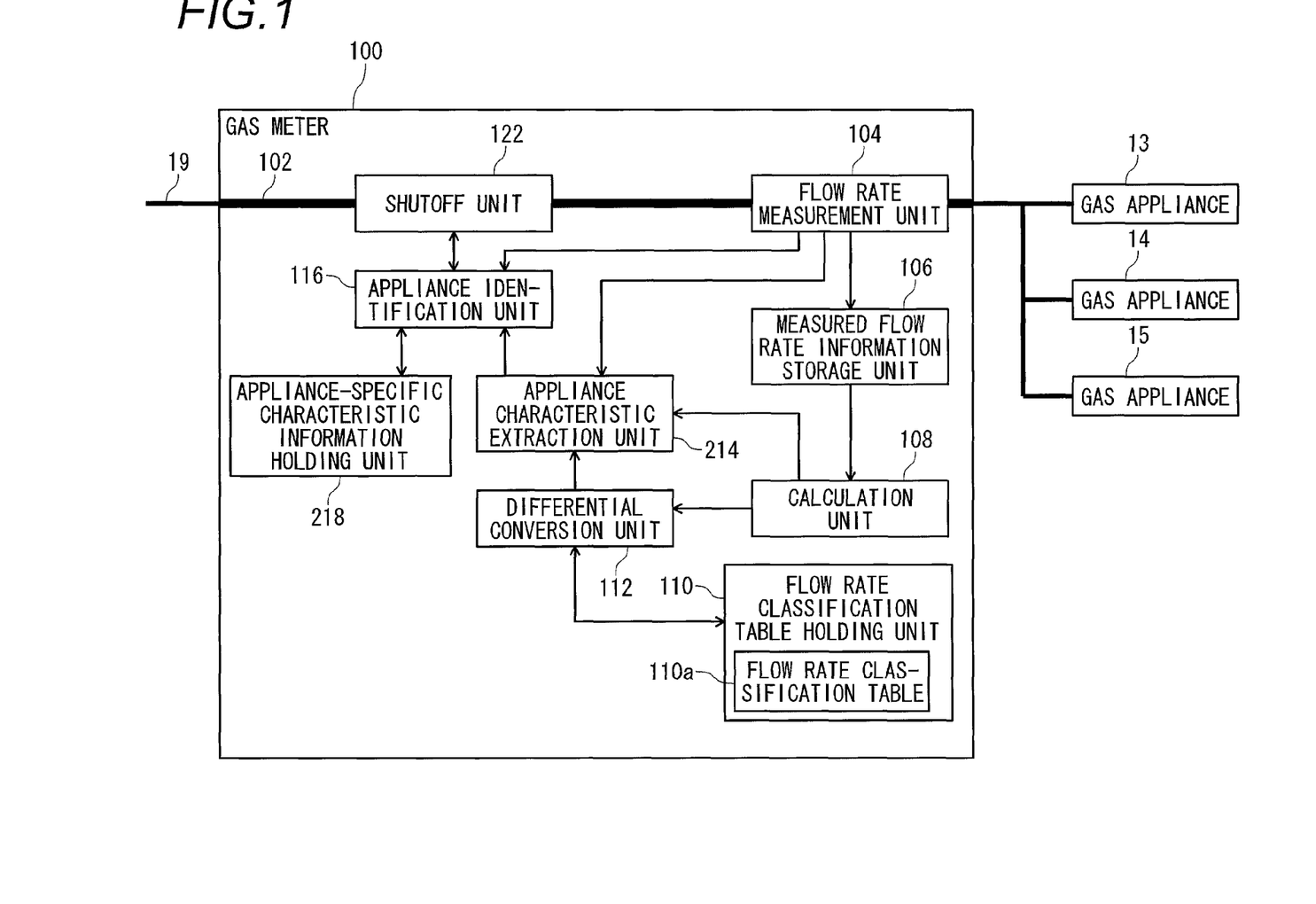
FIG. 1 is a block diagram of a flow rate measurement device in Embodiments 1 and 2 of the invention.

FIG. 1 is a block diagram of a flow rate measurement device in Embodiment 1 of the invention.

In FIG. 1, a gas meter 100 includes a flow channel 102, a flow rate measurement unit 104, a measured flow rate information storage unit 106, a calculation unit 108, a flow rate classification table holding unit 110, a differential conversion unit 112, an appliance characteristic extraction unit 214, an appliance identification unit 116, and an appliance-specific characteristic information holding unit 218. The gas meter 100 is disposed in the flow channel 102, and includes a shutoff unit 122 which shuts off gas in emergency or the like.

An ultrasonic flowmeter serving as the flow rate measurement unit 104 emits ultrasonic waves with respect to gas as a fluid flowing in the flow channel 102 at regular time intervals and measures the gas flow rate, and a general ultrasonic flowmeter may be used. The measured flow rate information storage unit 106 stores target data in which a measured flow rate measured by the flow rate measurement unit 104 is described in association with the measurement time at which the measured flow rate is measured.

The calculation unit 108 calculates differentials in the gas flow rate measured by the flow rate measurement unit 104 at regular time intervals corresponding to the above-described ultrasonic wave emission interval. For example, in FIG. 3(a) described below, when a flow rate (absolute flow rate) at a predetermined timing is 90 L/h (liters per hour), and a flow rate at the next timing is 145 L/h, the differential at this time is calculated to be 145−90=55 (L/h). The flow rate classification table holding unit 110 holds a flow rate classification table 110a shown in FIG. 2 in which a plurality of differential classifications classified according to the magnitude of the differentials are associated with codes representing the respective classifications. The flow rate classification table 110a serves as a conversion table which classifies the absolute values of the measured differentials into predetermined classifications and converts the differentials to predetermined codes representing the classifications. The number of classifications of the flow rate classification table 110a is not particularly limited, and in FIG. 2, for example, the differentials are classified into 16 codes. Although a region where it is determined that the flow rate is zero is described, there are few cases where the flow rate measured in the actual device is completely zero because of a few variations. Accordingly, the condition that the flow rate is zero includes when the flow rate is approximately zero, substantially zero.

Figure 2:
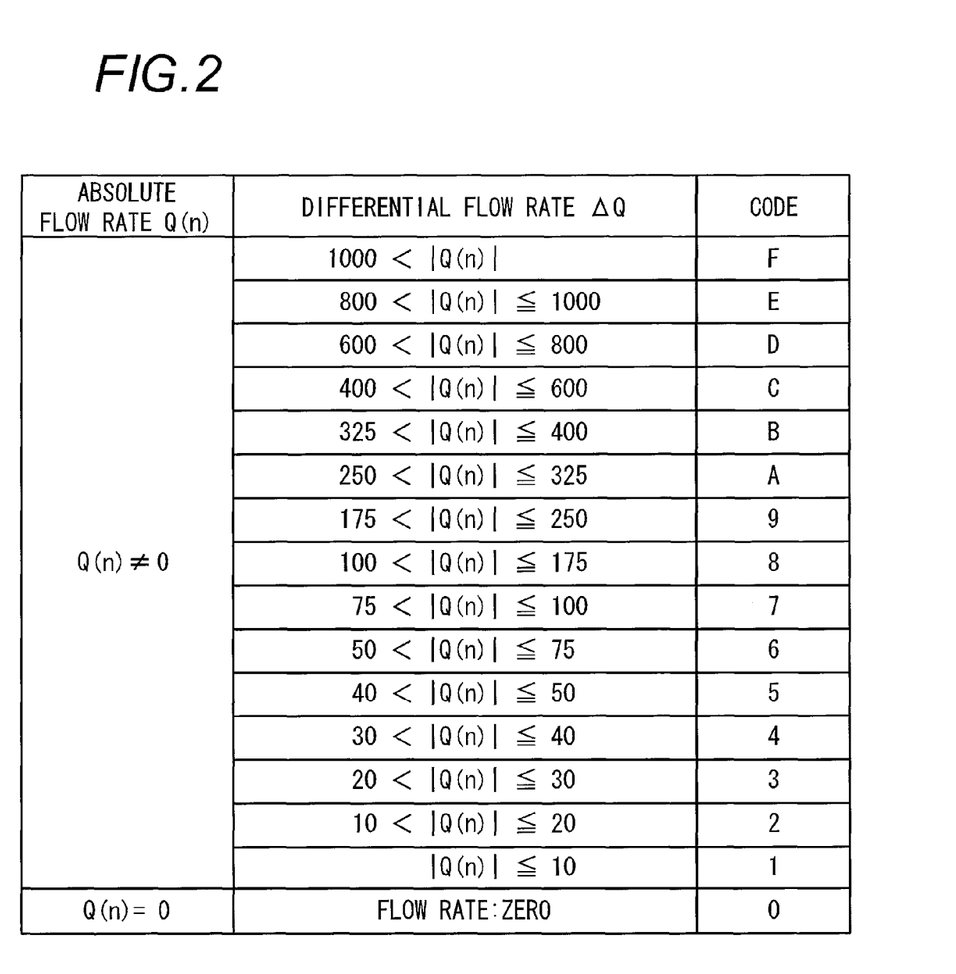
FIG. 2 is a diagram showing an example of a flow rate classification table in Embodiments 1 and 2 of the invention.

The ranges of the classifications are fragmented with different flow rate intervals. For example, the ranges of the classifications are fragmented with an increasing differential in the flow rate such that the codes 1 to 5 are 10 L/h, the codes 6 to B are 25 L/h, the codes C to D are 50 L/h, and the code E is 100 L/h. With this configuration, since there are many kinds of appliances in a region where the differential is small, the interval decreases, thereby increasing identification precision.

The codes A to F express 10 to 15 in hexadecimal, and magnitude comparison can be performed with the codes as numerical values.

The differential conversion unit 112 converts the differentials calculated by the calculation unit 108 to the codes representing the respective classifications, into which the differentials at regular time interval (of ultrasonic wave emission) are classified, on the basis of the flow rate classification table 110a.

The appliance characteristic extraction unit 214 generates an extracted code sequence representing the characteristics of the appliances from a measured code sequence obtained by actual measurement on the basis of a set of codes at regular time intervals obtained by the differential conversion unit 112. The measured code sequence expresses the change in the flow rate of the fluid in a pseudo manner. The appliance characteristic extraction unit 214 records the extracted code sequence representing the characteristics of the appliances in a memory (not shown) as necessary. The appliance characteristic extraction unit 214 monitors the gas flow rate measured by the flow rate measurement unit 104, extracts a plurality of appliance characteristic flow rates including, for example, the gentle ignition flow rate of the fan heater representing the characteristics of the appliances from the change in the flow rate, and stores the plurality of appliance characteristic flow rates in the memory (not shown) as necessary.

The appliance identification unit 116 identifies a gas appliance using gas as a fluid on the basis of the extracted code sequence extracted by the appliance characteristic extraction unit 214 and the appliance characteristic flow rate. The appliance identification unit 116 compares the extracted code sequence with appliance-specific characteristic code sequences representing characteristic code sequences specific to the appliances stored in the appliance-specific characteristic information holding unit 218 in advance for the gas appliances or a plurality of appliance characteristic flow rates, and identifies a gas appliance using gas from a similarity relation or the like.

The gas meter 100 is connected to a gas duct 19 on the upstream side, and is also connected to various gas appliances 13, 14, and 15, such as a hot plate, a fan heater, and floor heating, on the downstream side.

With regards to the flow rate measurement device configured as above, the operation of an appliance characteristic extraction process will be hereinafter described.

First, a flow rate (absolute flow rate) Q(n) measured by the flow rate measurement unit 104 at a regular time interval (for example, 0.5 seconds or the like) and a previously measured flow rate Q(n−1) are temporarily stored in the measured flow rate information storage unit 106. Thereafter, a differential ΔQ(n)=Q(n)−Q(n−1) which is the difference between Q(n) and the previously measured flow rate Q(n−1) is calculated by the calculation unit 108. The regular time interval may be 1 second or 2 seconds.

The differential conversion unit 112 converts the absolute value of the differential ΔQ(n) calculated by the calculation unit 108 to a classification code, which is a code representing each of the classifications for classifying the differentials at regular time intervals, with reference to the flow rate classification table 110a of FIG. 2. FIGS. 3(a) to 3(d) show an example of conversion using the flow rate classification table. If a gas appliance A (for example, a fan heater) corresponding to one of the gas appliances 13, 14, and 15 of FIG. 1 starts to be activated and a gas flow rate is generated, as shown in "FLOW RATE" of FIG. 3(a) and a graph of FIG. 3(b), the flow rate to be measured changes from the flow rate Q(n)=0 to the flow rate Q(n)≠0, and the flow rate changes depending on the used amount of gas. Simultaneously with measurement of the flow rate by the flow rate measurement unit 104, the calculation unit 108 calculates a differential, and the differential conversion unit 112 converts the differential to a classification code (shown in a "CODE" sequence of FIG. 3(a)).

Figure 3:
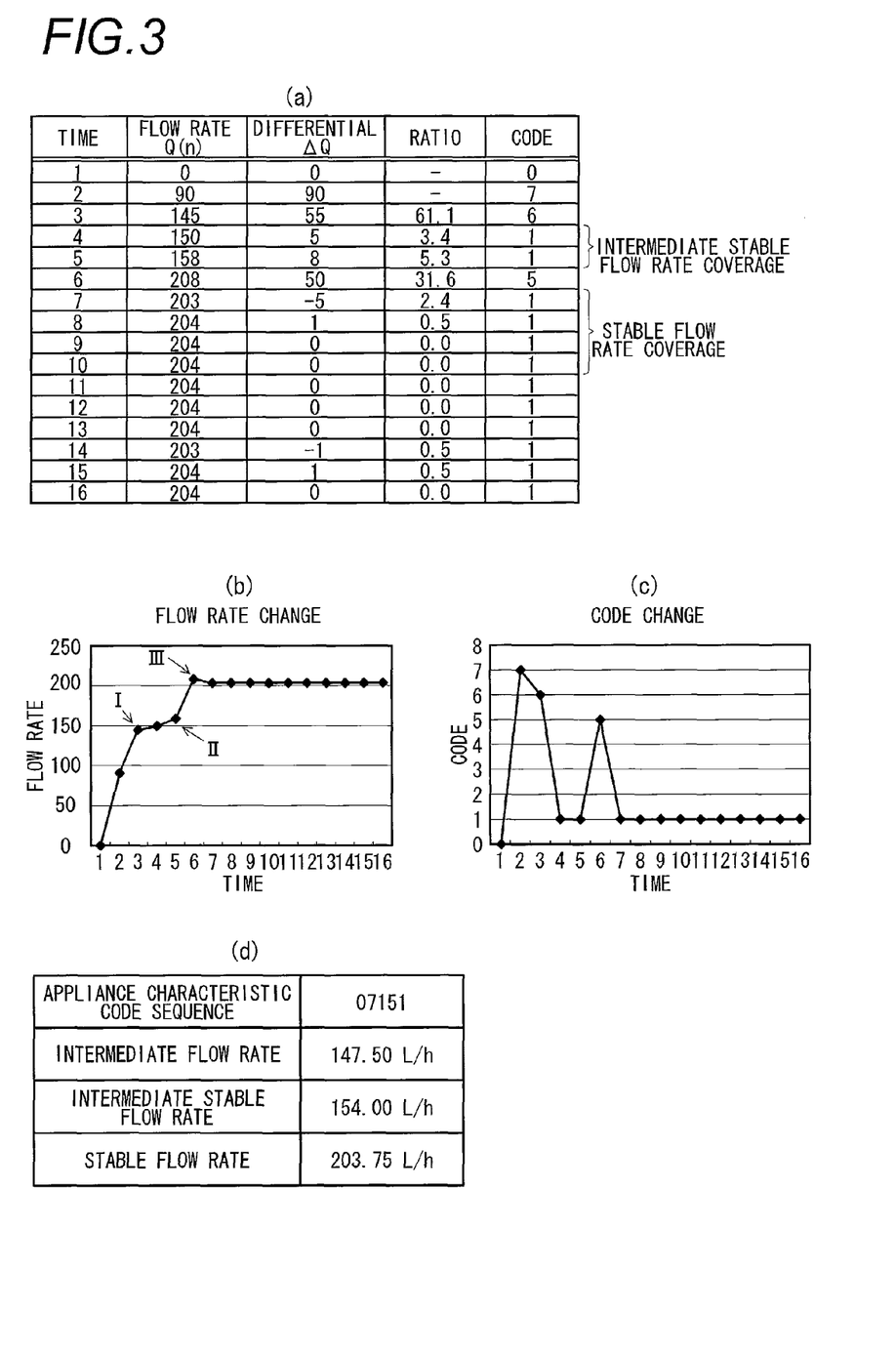

When codes converted by the differential conversion unit 112 are within a predetermined range, for example, codes equal to or smaller than 2 appear continuously a predetermined number of times, for example, two times, the appliance characteristic extraction unit 214 calculates the average value of the flow rates at that time and stores the average value as an intermediate stable flow rate which is one of the appliance characteristic flow rates. As shown in FIG. 3(a), at the time 4 and the time 5, codes equal to or smaller than 2 appear continuously two times. In this case, the average value 154 L/h of the flow rate 150 L/h of the time 4 and the flow rate 158 L/h of the time 5 is stored as the intermediate stable flow rate.

When codes converted by the differential conversion unit 112 are within a predetermined range, for example, codes equal to or smaller than 2 appear continuously a second predetermined number of times, for example, four times, the appliance characteristic extraction unit 214 calculates the average value of the flow rates at that time, and stores the average value as a stable flow rate which is one of the appliance characteristic flow rates. As shown in FIG. 3(a), at the time 7 to the time 10, codes are equal to or smaller than 2 appear continuously four times. In this case, the average value 203.75 L/h of the flow rate 203 L/h of the time 7, the flow rate 204 L/h of the time 8, the flow rate 204 L/h of the time 9, and the flow rate 204 L/h of the time 10 is stored as the stable flow rate.

As will be understood from the graph of FIG. 3(b), the stored intermediate stable flow rate corresponds to a gentle ignition flow rate (from a change point I to a change point II in the graph), the stable flow rate corresponds to a stable flow rate (after a change point III in the graph) immediately after ignition. It is thus understood that the appliance characteristic flow rates are sufficiently extracted.

When the flow rate measured by the flow rate measurement unit 104 is equal to or higher than a first predetermined flow rate, for example, 50 L/h and equal to or lower than a second predetermined flow rate, for example, 1000 L/h, the appliance characteristic extraction unit 214 calculates the ratio of the previous flow rate and the current flow rate. The first predetermined flow rate and the second predetermined flow rate are provided to prevent erroneous detection at the time of the start of rise in the flow rate resulting from the measurement timing or erroneous detection at the time of the change in the flow rate under control after a steep rise in a water heater.

Although the ratio (current flow rate/previous flow rate) of the current flow rate and the previous flow rate is 1 when the current flow rate and the previous flow rate are the same, the values in "RATIO" of FIG. 3(a) are calculated by the following expression.

$$\text{ratio} = (1 - \text{current flow rate}/\text{last flow rate}) \times 100$$

For convenience, the ratio is zero when the current flow rate and the previous flow rate are the same, and is expressed in percentage.

If the calculated ratio is within a predetermined ratio range, for example, within ±15%, the average flow rate of the current flow rate at that time and the last flow rate is stored as an intermediate flow rate which is one of the appliance characteristic flow rates. As shown in FIG. 3(a), at the time 4, since the ratio is within ±15%, the average value 147.5 L/h of the flow rate 145 L/h of the time 3 and the flow rate 150 L/h of the time 4 is stored as an intermediate flow rate. It is understood that, with this intermediate flow rate, even when the intermediate stable flow rate may not be detected, the appliance characteristics can be extracted, the appliance characteristic flow rates are extracted sufficiently compared to the intermediate stable flow rate 154 L/h.

As will be understood from the graph showing the change of the code shown in FIG. 3(c), when the appliance characteristic extraction unit 214 extracts the peak values of the peak and trough of the codes from the condition that the peak and trough of the codes represent the change points I, II, and III of FIG. 3(b), [07151] is extracted from a code sequence [0761115111111111] and stored as an appliance characteristic code sequence.

Figure 4:
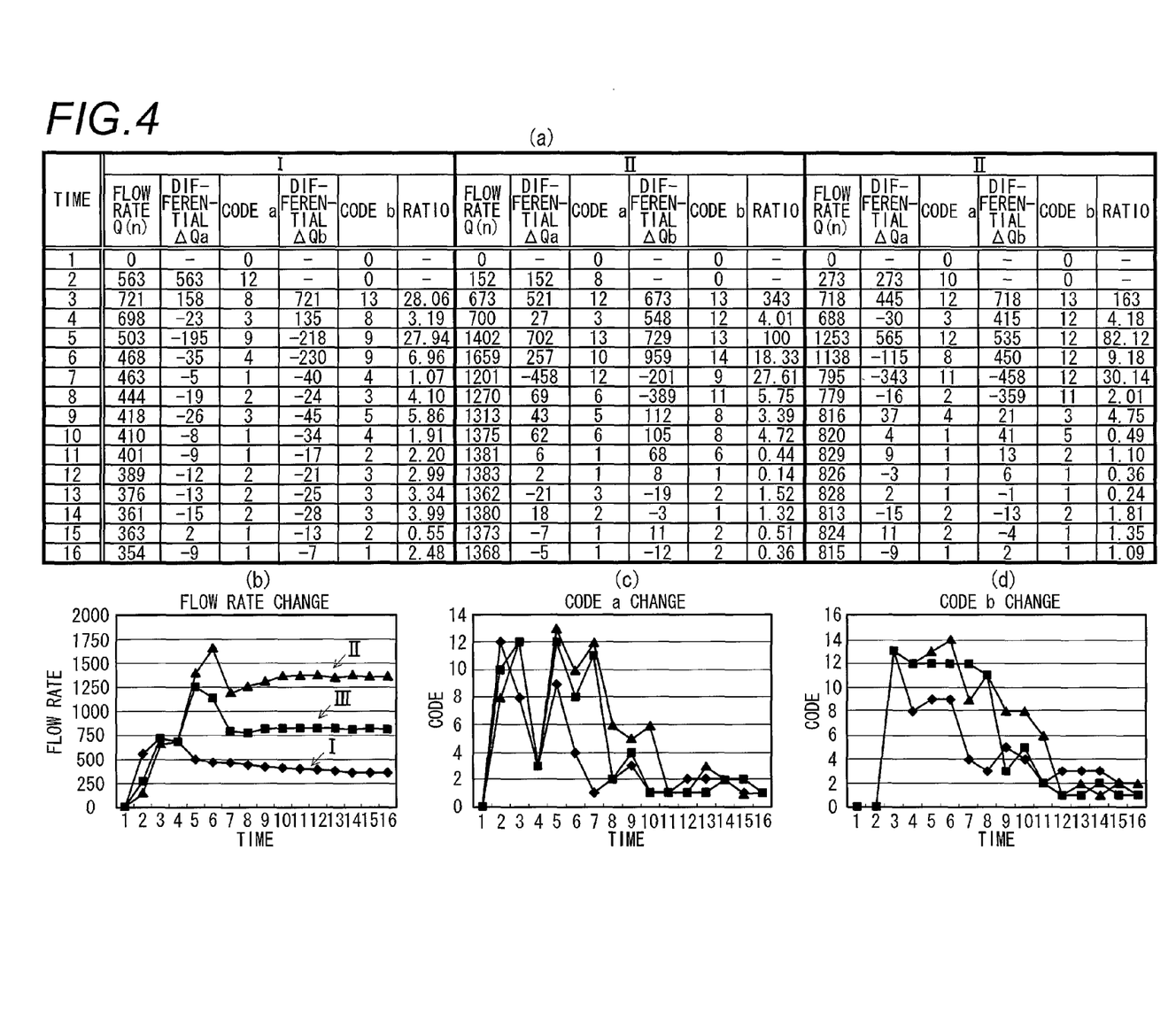

Next, FIGS. 4(a) to 4(d) are diagrams showing a concept of characteristic extraction when using a water heater B. It is assumed that I, II, and III shown in FIG. 4(a) are due to differences in hot water supply temperature setting and measured using the same water heater B. Incidentally, I is set at 32° C., II is set at 60° C., and III is set at 43° C.

FIG. 4(b) shows the change in the flow rate. After the time 4, flow rate control is activated based on the set temperature. With regards to a stable flow rate or an intermediate stable flow rate which is extracted as the appliance characteristic, various flow rates at different set temperatures are extracted. It is understood that, as shown in FIG. 4(c), the change in a code (a code a of FIG. 4(a)) converted by the differential conversion unit 112 on the basis of the differential (the differential ΔQa of FIG. 4(a)) between the current flow rate and the last flow rate calculated by the calculation unit 108 varies among I, II, and III. As shown in an appliance characteristic code sequence a of FIG. 5(a), an appliance characteristic code sequence extracted by the appliance characteristic extraction unit 214 shows different changes (FIG. 5(b)) among I, II, and III, and it becomes very difficult to determine to be the same appliance.

Figure 5:
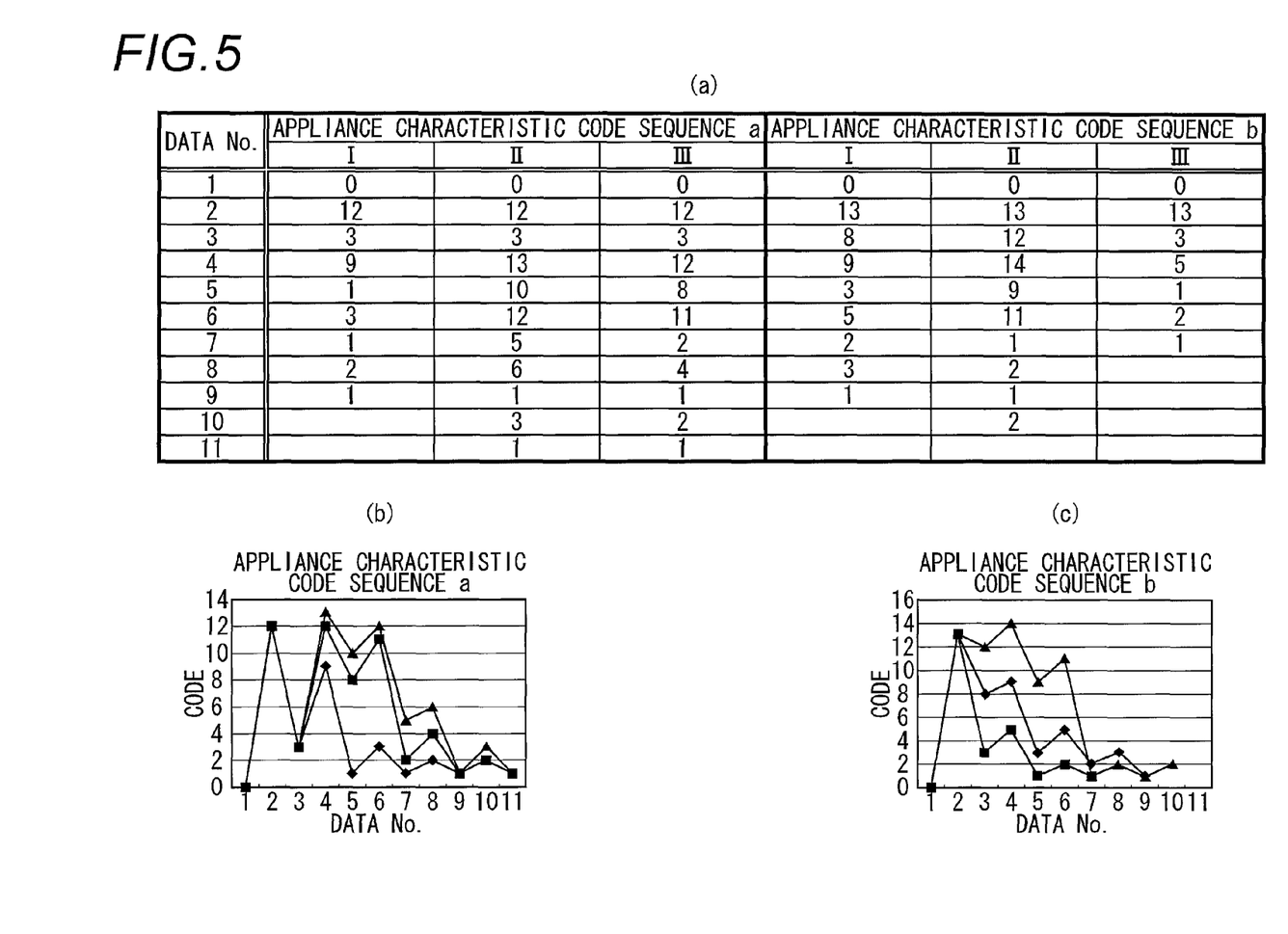

Accordingly, when the first peak value or the second peak value of an appliance characteristic code sequence a extracted by the appliance characteristic extraction unit 214 from a code a converted by the differential conversion unit 112 on the basis of first differentials calculated by the calculation unit 108, for example, the differential (a differential ΔQa of FIG. 4(a)) between the current flow rate and the last flow rate, for example, any code of the first peak or the second peak (data No. 2 or data No. 4) of a graph of FIG. 5(b) is equal to or greater than a first predetermined value, for example, equal to or greater than 11, when the first peak value or the second peak value of an appliance characteristic code sequence b extracted by the appliance characteristic extraction unit 214 from a code b converted by the differential conversion unit 112 on the basis of second differentials calculated by the calculation unit 108, for example, the differential (a differential ΔQb of FIG. 4(a)) between the current flow rate and the second last flow rate, for example, any code of the first peak or the second peak (data No. 2 or data No. 4) of a graph of FIG. 5(c) is equal to or greater than a second predetermined value, for example, equal to or greater than 12, and when the flow rate is equal to or higher than a predetermined flow rate, for example, 300 L/h no later than a predetermined number of times, for example, three times from a rise in the flow rate, the appliance identification unit 116 determines that a used appliance is a water heater. Therefore, it becomes possible to determine that the used appliance is a water heater even when the set temperature of the water heater differs, flow rate control is activated immediately after the rise in the flow rate, and the flow rate varies. Simultaneously, if it is determined that the flow rate is equal to or higher than a predetermined flow rate no later than a predetermined number of times from the rise in the flow rate, it is possible to reliably capture a steep rise which is the characteristic of the water heater, thereby improving identification precision.

As described above, in this embodiment, it is possible to extract the characteristics of the water heater even when the flow rate changes in various ways due to the difference in the set temperature or the like when the water heater is used, and to improve identification precision of the water heater.

Embodiment 2

Figure 6:
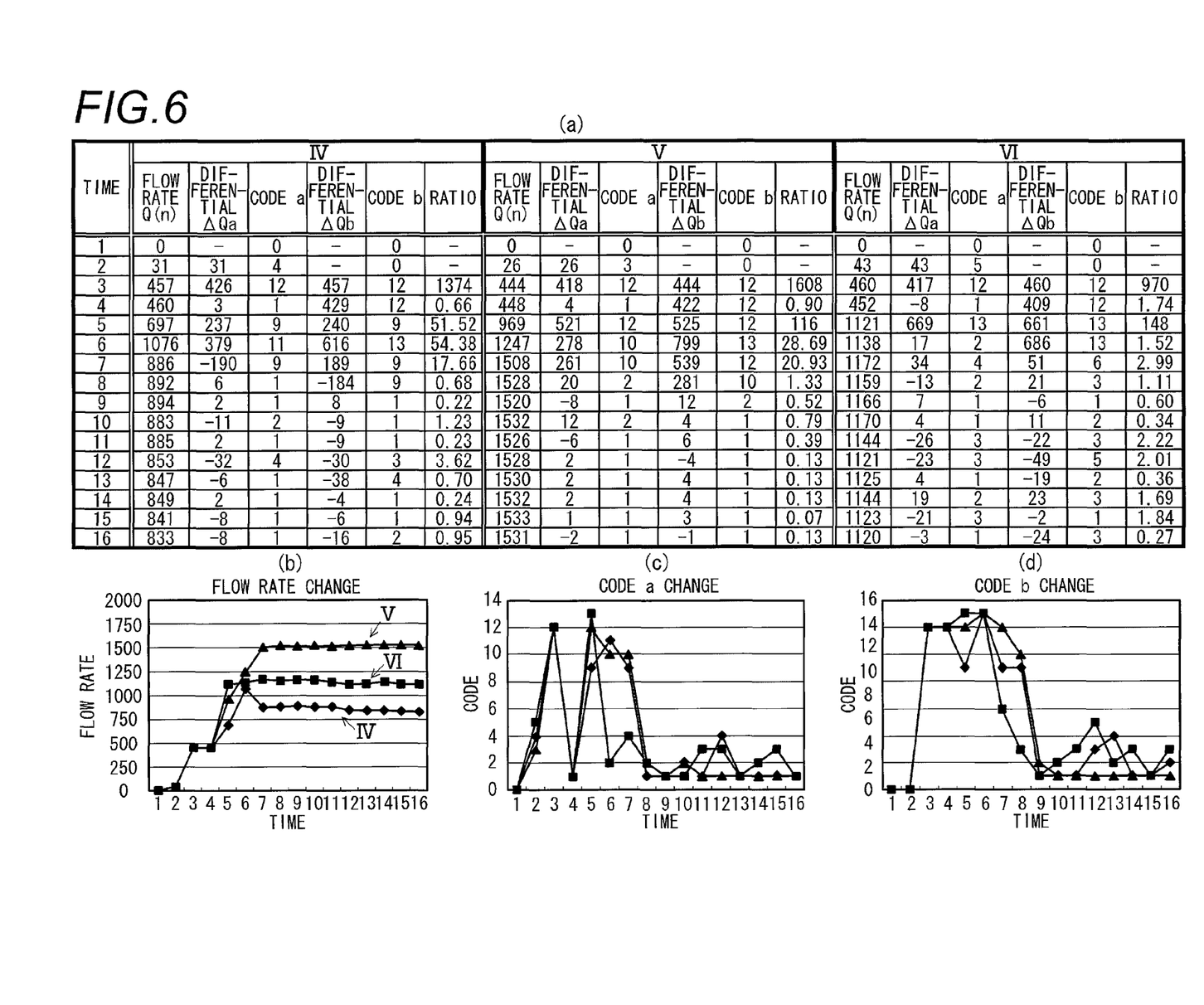

FIGS. 6(a) to 6(d) are diagrams showing a concept of characteristic extraction when using a water heater C. It is assumed that IV, V, and VI shown in FIG. 6(a) are due to a difference in water supply temperature setting and measured using the same water heater C. Incidentally, IV is set at 37° C., V is set at 60° C., and VI is set at 43° C.

Figure 7:
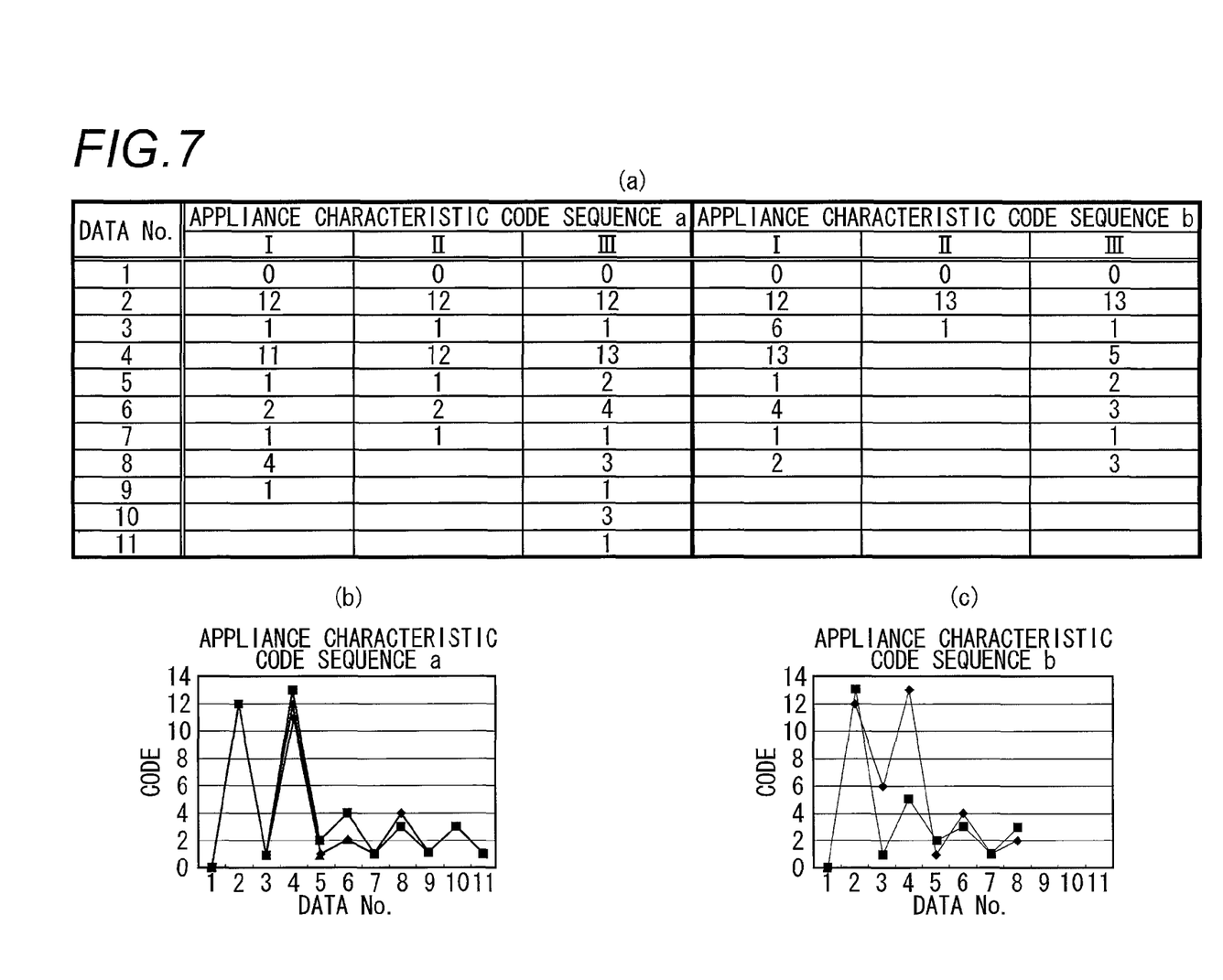

As described in Embodiment 1, the first peak value or the second peak value of the appliance characteristic code sequence a extracted by the appliance characteristic extraction unit 214 from the code a converted by the differential conversion unit 112 on the basis of first differentials calculated by the calculation unit 108, for example, the differential (a differential ΔQa of FIG. 6(a)) between the current flow rate and the last flow rate, for example, any code of the first peak or the second peak (data No. 2 or data No. 4) of a graph of FIG. 7(b) is equal to or greater than a first predetermined value, for example, equal to or greater than 11, when the first peak value or the second peak value of the appliance characteristic code sequence b extracted by the appliance characteristic extraction unit 214 from the code b converted by the differential conversion unit 112 on the basis of second differentials calculated by the calculation unit 108, for example, the differential (a differential ΔQb of FIG. 6(a)) between the current flow rate and the second last flow rate, for example, any code of the first peak or the second peak (data No. 2 or data No. 4) of a graph of FIG. 7(c) is equal to or greater than a second predetermined value, for example, equal to or greater than 12, and when the flow rate is equal to or higher than a predetermined flow rate, for example, 300 L/h no later than a predetermined number of times from the rise in the flow rate, the appliance identification unit 116 determines that the used appliance is a water heater.

When the characteristics of the water heater B described in Embodiment 1 are held in the appliance-specific characteristic information holding unit 218, the water heater C is used, and the appliance identification unit 116 identifies a water heater. Meanwhile, it is difficult to identify the water heater C and the water heater B held in the appliance-specific characteristic information holding unit 218.

Accordingly, comparison is performed using the intermediate flow rate which is the average flow rate of the current flow rate and the last flow rate extracted by the appliance characteristic extraction unit 214 when the ratio of the last flow rate and the current flow rate.

For example, with regards to the water heater B, as shown in the ratio of FIG. 4(a), in the case of I, at the time 4, since the calculated ratio is within a predetermined ratio range, for example, within ±15%, the average value 709.5 L/h of the flow rate 721 L/h of the time 3 and the flow rate 698 L/h of the time 4 becomes an intermediate flow rate. In the case of II, at the time 4, since the ratio is within ±15%, the average value 686.5 L/h of the flow rate 673 L/h of the time 3 and the flow rate 700 L/h of the time 4 becomes an intermediate flow rate. In the case of III, at the time 4, since the ratio is within ±15%, the average value 703 L/h of the flow rate 718 L/h of the time 3 and the flow rate 688 L/h of the time 4 becomes an intermediate flow rate.

For convenience, since the ratio is calculated such that the ratio is zero when the current flow rate and the previous flow rate are the same, when the ratio is close to zero, the intermediate flow rate is stored. This is the same as a case where, when the ratio (current flow rate/previous flow rate) of the current flow rate and the previous flow rate is close to 1, the intermediate flow rate is stored.

Similarly, with regards to the water heater C, as shown in the ratio of FIG. 6(a), in the case of IV, at the time 4, since the ratio is within ±15%, the average value 458.5 L/h of the flow rate 457 L/h of the time 3 and the flow rate 460 L/h of the time 4 becomes an intermediate flow rate. In the case of V, at the time 4, since the ratio is within ±15%, the average value 446 L/h of the flow rate 444 L/h of the time 3 and the flow rate 448 L/h of the time 4 becomes an intermediate flow rate. In the case of VI, at the time 4, since the ratio is within ±15%, the average value 456 L/h of the flow rate 460 L/h of the time 3 and the flow rate 452 L/h of the time 4 becomes an intermediate flow rate.

Figure 8:
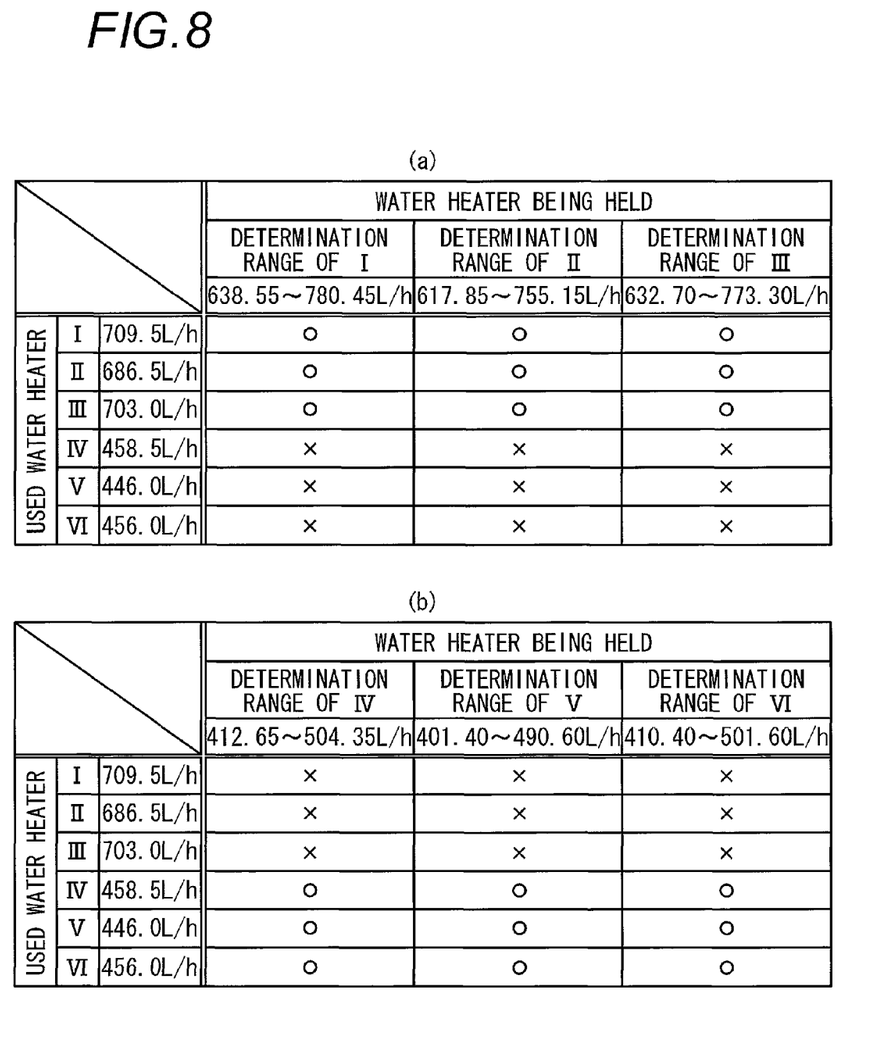

FIG. 8(a) shows a list of determination contents of a used water heater when any of I, II, and III of the water heater B is held in the appliance-specific characteristic information holding unit 218. FIG. 8(b) shows a list of determination contents of a used water heater when any of IV, V, and VI of the water heater C is held in the appliance-specific characteristic information holding unit 218. In the respective lists, "○" represents the determination to be the same appliance, and "×" represents the determination to be different appliances.

For example, in FIG. 8(a), when an appliance being held is I of the water heater B, the intermediate flow rate is 709.5 L/h. If the flow rate is within ±10% of the intermediate flow rate, it is determined to be the same appliance. In this case, the determination range is from 638.55 L/h to 780.45 L/h. When the used appliances are I, II, and III, all are determined to be the same appliance. Similarly, when the appliance being held is II or III, and when the used appliances are I, II, and III, all are determined to be the same appliance. Meanwhile, when the used appliances are IV, V, and VI of the water heater C, all are determined to be different appliances, and the water heater B and the water heater C can be determined to be different appliances.

Similarly, as shown in FIG. 8(b), when any of IV, V, and VI of the water heater C is held, all of I, II, and III of the water heater B can be determined to be different appliances, and all of IV, V, and VI of the water heater C can be determined to the same appliance.

As described above, in this embodiment, it is possible to identify water heaters having different characteristics as well as a single water heater, and to improve identification precision of the water heater.

Although in the foregoing embodiments, an example where a water heater is used as a specific kind of appliance has been described, the invention is not limited to a water heater.

Although in the foregoing embodiments, a case where an ultrasonic flowmeter is used as the flow rate measurement unit has been described, even in another type of instantaneous flow rate measurement device which uses a sampling signal, it is obvious that the same effects are obtained. Although description of process after appliance identification is omitted, it is obvious in the gas meter that an appliance specific charge based on the measurement of the integrated flow rate for each registered appliance or each classified group may be set, and that an appliance specific security function for safety control (security function) for each registered appliance or each classified group may be set. If a transmitting and receiving unit, such as a wireless device, may be mounted in a gas meter and a gas appliance, it is obvious that the precision of appliance identification is improved.

Although in the foregoing embodiments, the appliance characteristic extraction using codes converted from flow rate differentials at regular time intervals has been described, more accurate characteristic extraction may be performed using the flow rate differentials.

In the foregoing embodiments, with regards to an appliance-specific characteristic code sequence or an appliance-specific characteristic flow rate, actual flow rate measurement is repeated, and correction is made taking into consideration variations. An appliance registration mode may be provided, an appliance may be repeatedly operated on site, the appliance characteristic may be extracted and averaged, and the characteristic may be registered as an appliance-specific characteristic code sequence or an appliance-specific characteristic flow rate. An appliance-specific characteristic code sequence or an appliance-specific characteristic flow rate may be registered automatically by learning without setting an appliance-specific code sequence or an appliance-specific characteristic flow rate in advance.

Although various embodiments of the invention have been described, the invention is not limited to the embodiments, and the invention will also be subjected to various alterations or applications by those skilled in the art on the basis of the description of the specification and the well-known techniques without departing the spirit and scope of the invention. The alterations or modifications shall also fall within the range where protection of the present invention is sought.

Although the invention has been described in detail or in connection with specific examples, it is obvious to those skilled in the art that various changes or modifications may be made without departing from the spirit and scope of the invention.

This application is based on Japanese Patent Application No. 2009-251700 filed on Nov. 2, 2009, the content of which is incorporated herein by reference.

INDUSTRIAL APPLICABILITY

As described above, the flow rate measurement device according to the invention can extract characteristics of appliances, and can be thus applied for specifying a used appliance connected to the downstream side of the flow rate measurement device or grouping even in an industrial flowmeter or a water meter.

The invention claimed is:

1. A flow rate measurement device, comprising:
a flow rate measurement unit that is configured to measure a flow rate of a fluid flowing in a flow channel at a regular time interval;
a calculation unit that is configured to calculate a plurality of differentials at regular time intervals in the flow rates measured by the flow rate measurement unit;
a flow rate classification table in which a plurality of differential classifications classified according to a magnitude of the differentials are associated with codes representing the respective differential classifications;
a differential conversion unit that is configured to convert the differentials calculated by the calculation unit to the codes based on the flow rate classification table;
an appliance characteristic extraction unit that is configured to generate a plurality of appliance-specific code sequences representing characteristics of appliances from a plurality of codes obtained at regular time intervals by the differential conversion unit or extract a plurality of appliance characteristic flow rates representing characteristics of appliances from the flow rates measured by the flow rate measurement unit; and
an appliance identification unit that is configured to compare at least either the appliance-specific code sequences extracted by the appliance characteristic extraction unit with appliance-specific code sequences specific to the appliances held in an appliance-specific characteristic information holding unit or a plurality of appliance characteristic flow rates extracted by the appliance characteristic extraction unit with a plurality of appliance-specific characteristic flow rates specific to the appliances held in the appliance-specific characteristic information holding unit to identify the appliances, wherein
when a first peak value or a second peak value of a first appliance characteristic code sequence extracted by the appliance characteristic extraction unit based on codes converted by the differential conversion unit from first differentials calculated by the calculation unit is equal to or greater than a first predetermined value, when a first peak value or a second peak value of a second appliance characteristic code sequence extracted by the appliance characteristic extraction unit based on codes converted by the differential conversion unit from second differentials calculated by the calculation unit is equal to or greater than a second predetermined value, and when the flow rate measured by the flow rate measurement unit is equal to or higher than a predetermined flow rate no later than a predetermined number of times from a rise in the flow rate, the appliance identification unit determines that a used appliance is a specific kind of appliance.

2. The flow rate measurement device according to claim 1, wherein when the appliance identification unit has determined that the used appliance is the specific kind of appliance, and compares the used appliance in characteristics with a specific kind of appliance held in the appliance-specific characteristic information holding unit, and if an average flow rate of a current flow rate and a last flow rate extracted by the appliance characteristic extraction unit when a ratio of the last flow rate and the current flow rate is within a predetermined range is different from an average flow rate held in the appliance-specific characteristic information holding unit, the appliance identification unit determines that the used appliance is another specific kind of appliance.

\* \* \* \* \*